(12) United States Patent
Westerweck

(10) Patent No.: US 7,806,606 B2
(45) Date of Patent: Oct. 5, 2010

(54) MINIATURE CAMERA SHUTTER AND FILTER/APERTURE

(75) Inventor: Lothar Westerweck, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 273 days.

(21) Appl. No.: 12/150,874

(22) Filed: Apr. 30, 2008

(65) Prior Publication Data

US 2008/0279545 A1  Nov. 13, 2008

Related U.S. Application Data

(60) Provisional application No. 60/928,135, filed on May 7, 2007.

(51) Int. Cl.
*G03B 9/10* (2006.01)

(52) U.S. Cl. ................................. 396/493; 396/510

(58) Field of Classification Search .............. 396/463, 396/505–510, 467, 493–494, 497–501
See application file for complete search history.

(56) References Cited

U.S. PATENT DOCUMENTS

| | | | |
|---|---|---|---|
| 2,279,372 A | 4/1942 | Herzberger | 88/57 |
| 3,087,384 A | 4/1963 | Baur et al. | 88/57 |
| 3,599,377 A | 8/1971 | Dartnell | 51/284 |
| 3,609,270 A | 9/1971 | Jorgensen et al. | 200/67 |
| 4,257,086 A * | 3/1981 | Gulliksen | 362/279 |
| 4,879,592 A | 11/1989 | Ernest | 358/42 |
| 5,016,993 A | 5/1991 | Akitake | 350/429 |
| 5,095,204 A | 3/1992 | Novini | 250/223 B |
| 5,177,638 A | 1/1993 | Emura et al. | 359/704 |
| 5,196,963 A | 3/1993 | Sato et al. | 359/699 |
| 5,272,567 A | 12/1993 | Inoue | 359/696 |
| 5,546,147 A | 8/1996 | Baxter et al. | 354/187 |
| 5,689,746 A | 11/1997 | Akada et al. | |
| 5,754,210 A | 5/1998 | Haneda et al. | 347/116 |
| 5,805,362 A | 9/1998 | Hayes | 359/819 |
| 5,835,208 A | 11/1998 | Hollmann et al. | 356/124 |

(Continued)

FOREIGN PATENT DOCUMENTS

EP   1148406 A2   10/2001

(Continued)

OTHER PUBLICATIONS

"High Precision Optical Assembly Starts Here," (6 pages) 1996, Opto-Alignment Technology, Inc.

(Continued)

*Primary Examiner*—W. B. Perkey
*Assistant Examiner*—Dennis Hancock
(74) *Attorney, Agent, or Firm*—Haverstock & Owens LLP

(57) ABSTRACT

The present invention is a miniature camera module for use in miniature camera applications. It is an object of the present invention to provide the miniature camera module with solenoid controlled blades in order to alter the amount and quality of light passing through a conduit disposed on the surface of the module. In some embodiments of the present invention, the blade comprises a shutter to completely block light. In other embodiments, the blade comprises an aperture, a neutral-density filter, a monochromatic filter, and the like. In some embodiments of the present invention, the miniature camera module is positioned within a more elaborate miniature camera chassis.

25 Claims, 15 Drawing Sheets

U.S. PATENT DOCUMENTS

| | | | |
|---|---|---|---|
| 5,926,965 A | 7/1999 | Shijo et al. | 33/390 |
| 5,954,192 A | 9/1999 | Iitsuka | 200/336 |
| 5,966,248 A | 10/1999 | Kurokawa et al. | 359/697 |
| 6,091,902 A | 7/2000 | Komatsuzaki et al. | 396/60 |
| 6,292,306 B1 | 9/2001 | Betensky | 359/663 |
| 6,330,400 B1 | 12/2001 | Bittner et al. | 396/72 |
| 6,417,601 B1 | 7/2002 | Kim | 310/333 |
| 6,530,703 B2 | 3/2003 | Nakano et al. | |
| 6,597,516 B2 | 7/2003 | Saitoh et al. | 359/694 |
| 6,760,167 B2 | 7/2004 | Meehan et al. | 359/822 |
| 6,762,888 B1 | 7/2004 | Oshima | 359/696 |
| 6,805,499 B2 | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,010,224 B2 | 3/2006 | Nomura | 396/85 |
| 7,088,525 B2 | 8/2006 | Finizion et al. | 359/703 |
| 7,156,564 B2 | 1/2007 | Watanabe et al. | |
| 7,193,793 B2 | 3/2007 | Murakami et al. | 359/791 |
| 7,301,712 B2 | 11/2007 | Kamo | 359/785 |
| 7,330,648 B2 | 2/2008 | Morinaga et al. | 396/144 |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi et al. | 348/335 |
| 2002/0018140 A1 | 2/2002 | Suemoto et al. | 348/358 |
| 2002/0102946 A1 | 8/2002 | SanGiovanni | 455/90 |
| 2002/0136556 A1* | 9/2002 | Nomura et al. | 396/458 |
| 2003/0174419 A1 | 9/2003 | Kindler et al. | 359/819 |
| 2004/0042780 A1* | 3/2004 | Kindaichi et al. | 396/112 |
| 2004/0042785 A1 | 3/2004 | Watanabe et al. | |
| 2004/0042786 A1 | 3/2004 | Watanabe et al. | |
| 2004/0056970 A1 | 3/2004 | Westerweck et al. | 348/240.3 |
| 2004/0056974 A1* | 3/2004 | Kitajima et al. | 348/335 |
| 2004/0203532 A1 | 10/2004 | Mizuta | 455/90.3 |
| 2004/0258405 A1 | 12/2004 | Shiratori et al. | 396/458 |
| 2005/0063698 A1* | 3/2005 | Usuda et al. | 396/489 |
| 2005/0157195 A1 | 7/2005 | Ohashi et al. | |
| 2005/0264670 A1 | 12/2005 | Yamaguchi et al. | 348/335 |
| 2006/0049720 A1 | 3/2006 | Henderson et al. | 310/328 |
| 2006/0056389 A1 | 3/2006 | Monk et al. | 370/352 |
| 2006/0083503 A1* | 4/2006 | Fukai | 396/55 |
| 2006/0113867 A1 | 6/2006 | Sakatani et al. | 310/323.17 |
| 2006/0124746 A1 | 6/2006 | Kim et al. | |
| 2006/0291061 A1 | 12/2006 | Iyama et al. | 359/614 |
| 2007/0053672 A1 | 3/2007 | Westerweck et al. | 396/79 |
| 2007/0074966 A1 | 4/2007 | Yamamoto et al. | 200/547 |
| 2007/0077051 A1 | 4/2007 | Toor et al. | 396/144 |
| 2007/0077052 A1 | 4/2007 | Chang | 396/144 |
| 2007/0086777 A1 | 4/2007 | Fujita | 396/452 |
| 2007/0122146 A1 | 5/2007 | Ryu | 396/529 |
| 2007/0201866 A1* | 8/2007 | Kihara | 396/468 |

FOREIGN PATENT DOCUMENTS

| | | | |
|---|---|---|---|
| EP | 1148406 A3 | | 6/2002 |
| EP | 1357726 | | 10/2003 |
| GB | 1378515 | | 12/1974 |
| GB | 2315186 A | | 1/1998 |
| GB | 2387063 A | | 10/2003 |
| JP | 02123335 A | * | 5/1990 |
| JP | 11-72678 | | 3/1999 |
| JP | 2002-286987 | | 10/2002 |

OTHER PUBLICATIONS

Non-Final Office Action dated Jun. 11, 2009, U.S. Appl. No. 12/287,469, filed Oct. 8, 2008, Westerweck, Lothar.

Office Action regarding Chinese Patent Application No. 200680041383.0, Application Date: Sep. 5, 2006, date of Office Action: Dec. 18, 2009, 8 pages.

Office Action that was mailed on Mar. 18, 2010, U.S. Appl. No. 12/150,219, filed Apr. 25, 2008, 39 pages.

Notice of Allowance mailed Jul. 30, 2010, U.S. Appl. No. 12/150,219, filing date: Apr. 25, 2008, 10 pages.

* cited by examiner

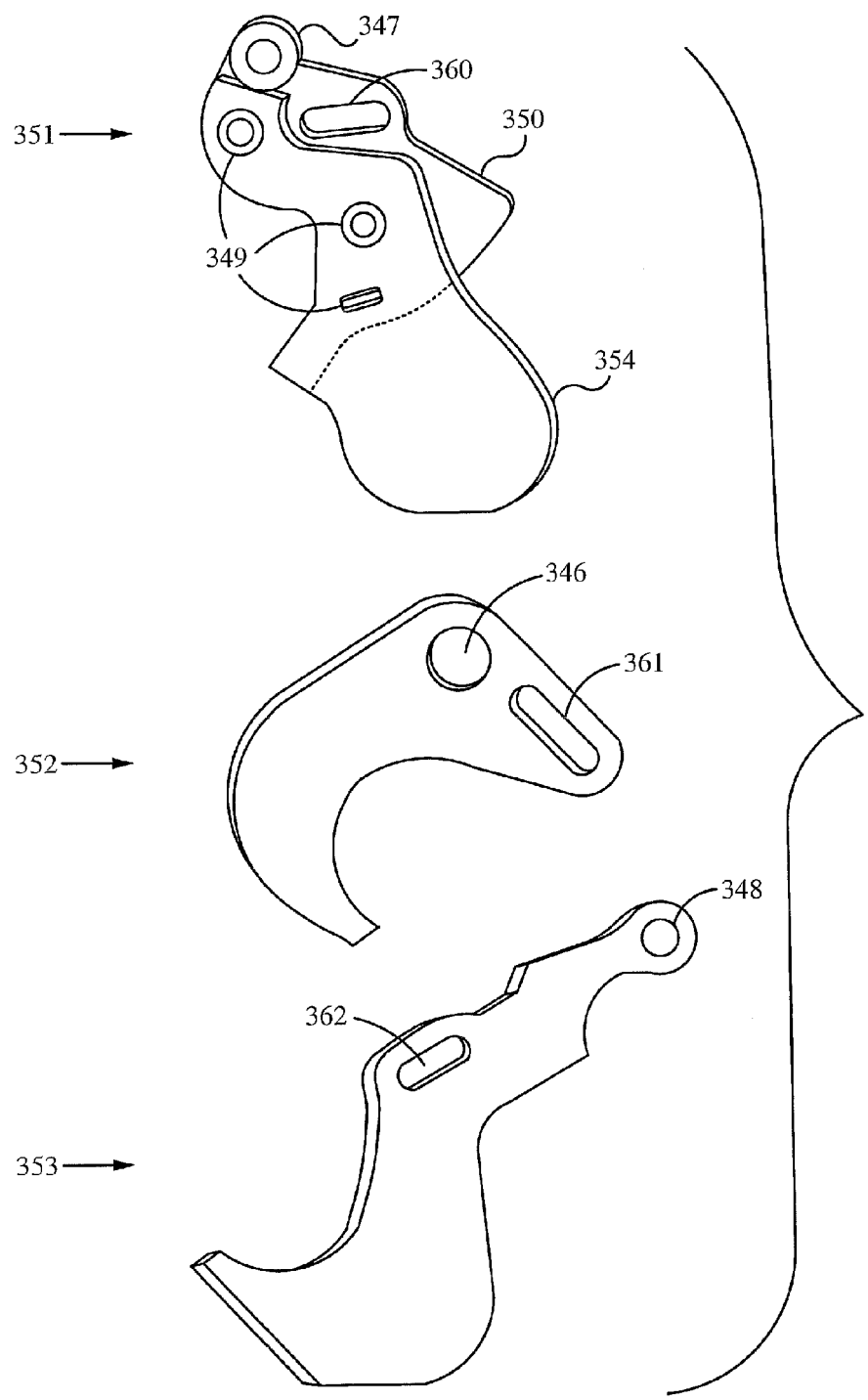

MINIATURE CAMERA SHUTTER AND FILTER/APERTURE

RELATED APPLICATIONS

This Patent Application claims priority under 35 U.S.C. §119(e) of the U.S. Provisional Patent Application, Ser. No. 60/928,135, filed May 7, 2007, and entitled, "MINIATURE CAMERA SHUTTER AND FILTER/APERTURE". The Provisional Patent Application, Ser. No. 60/928,135, filed May 7, 2007, and entitled, "MINIATURE CAMERA SHUTTER AND FILTER/APERTURE" is also hereby incorporated by reference in its entirety.

FIELD OF THE INVENTION

The present invention relates generally to the field of image capture systems. More specifically, the present invention relates to shuttering, adjusting aperture size and filtering optical exposures in a camera system having restrictive size limitations.

BACKGROUND OF THE INVENTION

For the purpose of this application, unless otherwise indicated expressly or impliedly by the context of the description, the term "conduit" shall mean an opening in a camera shutter module designed to allow the passage of light therethrough. Likewise, the term "aperture" shall mean an apparatus for allowing less than 100% of an amount of light through a conduit.

Also, the terms "camera shutter module" and "miniature camera shutter module" shall mean an apparatus incorporated within a camera optics system used to affect the amount and/or quality of light passing through the optics system to an imaging surface whether or not the apparatus is configured for shuttering light. For example, a miniature camera shutter module may refer to an apparatus configured for shuttering light, or for an apparatus configured for affecting the amount and/or quality of light without actually shuttering light. Of course, a miniature camera shutter module may also refer to an apparatus configured for shuttering, filtering and for providing an aperture for light in a camera optics system.

Cameras commonly include mechanical structures for shuttering light, adjusting an amount of light and adjusting the quality of light that is able to pass through a conduit and fall incident upon an imaging surface.

The camera shutter is a device that alternatively allows light to pass through a conduit to an imaging surface for a certain period of time and blocks the light so as to limit the time light falls incident upon the imaging surface. It is advantageous to have the ability to control the shutter speed, or the time the imaging surface is exposed to light. Furthermore, in digital camera applications, it is important to shutter light in order to allow an imaging surface to process an exposure of light.

It is also advantageous to control the percentage of an amount of light that is exposed to an imaging surface. An aperture is a device which can be used to limit the total amount of light able to pass through a conduit onto an imaging surface. For example, a smaller aperture lets less light onto the imaging surface so that bright images may be processed, whereas a larger aperture allows more light onto the imaging surface to expose darker images. It is also advantageous to control the quality of light falling incident upon an imaging surface by utilizing filters. For example, it may be desirable to reduce the intensity of the light passing through to an imaging surface. Neutral density filters reduce light of all relevant wavelengths from entering an imaging surface. Using a neutral density filter allows a user to reduce a portion of light while maintaining a constant aperture setting. Neutral density filters are particularly useful in preventing overexposure during bright conditions. Also, in some instances it is desirable to filter particular wavelengths of light. For example, ultraviolet filters are used to reduce haziness in images created by ultraviolet light. In other camera applications, color filters are used to compensate for the effects of lighting or for contrast enhancement.

Notwithstanding the advantages provided by utilizing shutters, apertures and filters in photography applications, their use has not been adequately utilized in miniature camera applications such as cameras incorporated into cellular phones, personal digital assistant devices, and the like. This is because, it is oftentimes the case that the camera lens chassis of such devices are designed such that it is impossible or extremely impracticable to include shutters, apertures and filter modules. For example, digital camera applications typically require the use of sensitive position sensors to track the position of certain components in the optical train and to adjust the system setting as those components move in relation to an image sensor, such as an array of charge-coupled devices (CCD) or a CMOS sensors. In such applications, it is important not to crowd the sensor or else the image will not be processed correctly. Known techniques do not adequately address this problem.

Furthermore, it is often the case that a shutter should be placed as close to the plane of a conduit as possible for calibration and image processing purposes. As such, the problems associated with sensor crowding are not able to be obviated simply by placing a shutter at a more convenient place along an optical train, but at a distance from the conduit.

As explained above, it is difficult to house a module for controlling shutters, apertures and filters, among other components, within a miniature camera chassis. However, the use of these components if oftentimes crucial in camera applications. For example, shutters are required to block light as a imaging sensor processes an exposure. Also, apertures and filters are oftentimes needed to reduce and filter light so that an image does not become overexposed or washed out.

SUMMARY OF THE INVENTION

According to some embodiments of the present invention, a single miniature camera shutter module is designed to fit into a miniature camera chassis, wherein the module gives the user the ability able to control the amount, quality and exposure time of light on an imaging surface in miniature camera applications. In some embodiments of the present invention, the miniature camera shutter module is specifically designed to accommodate particular camera chassis designs. According to these embodiments, the module size and shape, solenoid placement, axis placement, guide orientation, among other design features are custom designed to accommodate the unique chassis.

In some embodiments of the present invention, the miniature camera shutter module comprises a frame with a conduit for the passage of light therethrough. At least one solenoid device is coupled to the frame and is actuated in response to a signal. The solenoid device causes at least one blade to at least partially eclipse the conduit upon actuation of the solenoid. In some embodiments of the present invention, the blade comprises a shutter to completely block light. In other embodiments, the blade comprises an aperture, a neutral-density filter, a monochromatic filter, or the like.

Furthermore, a method of manufacturing a miniature camera shutter module is disclosed which gives the user the ability able to control the amount, quality and exposure time of light on a imaging surface in miniature camera applications.

In some embodiments of the present invention, one solenoid controls more than one blade upon actuation. According to these embodiments, the solenoids, pins, guides, etc are precisely placed such that the module does not crowd the other components of a camera chassis (i.e. a position sensor).

According to some embodiments of the present invention, a number of shutter blades, aperture blades and filters, among other accessories, are able to be housed and are controllable on a single module frame. In some other embodiments of the present invention, methods of configuring the one or more blades used to shutter, aperture or filter light with a unique geometry in order to accomplish design goals are disclosed. For example, in some embodiments of the present invention, solenoid is configured to actuate a blade about an axle, wherein the axle is positioned very close to the conduit, allowing the module to be more compact. In another example, a module with one solenoid configured to actuate two blades is designed such that when the solenoid receives a signal from a user, a relatively low power is required from the solenoid to adequately achieve the desired result, thus allowing a smaller solenoid to be used. Smaller solenoids, in turn, allow the camera shutter module of the present invention is able to be used in an extremely small camera chassis.

According to these embodiments, a user is able to control the amount, quality and exposure time of light on an imaging surface in miniature camera applications. In some embodiments of the present invention, the miniature camera shutter module is positioned within the chassis of a cellular telephone having image recording capabilities or within other common consumer electronic devices now known or those developed in the future.

BRIEF DESCRIPTION OF THE DRAWINGS

FIG. 3C illustrates a perspective schematic view of the blades used in a miniature camera shutter module according to some embodiments of the present invention.

DETAILED DESCRIPTION

Disclosed are improved apparatus designs and improved techniques used for shuttering, adjusting aperture size and filtering light in a miniature camera apparatus. Also disclosed are methods of manufacturing the same. Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Figure 1A:
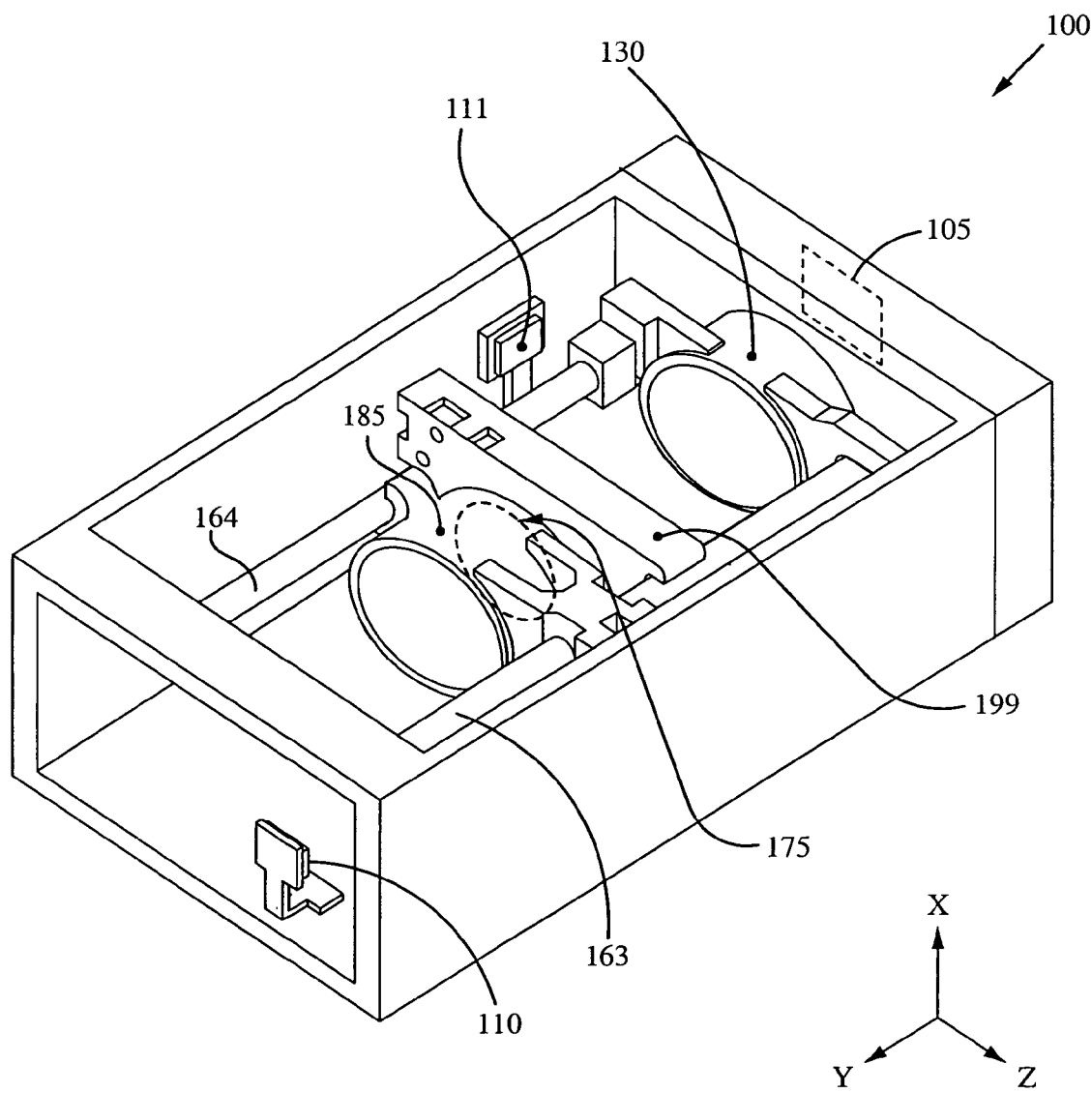
FIG. 1A illustrates a schematic isometric view of a miniature camera chassis with a miniature camera shutter module according to some embodiments of the present invention.

FIG. 1A illustrates a schematic isometric view of a miniature camera chassis 100 with a miniature camera shutter module 199 according to some embodiments of the present invention. The camera chassis 100 also comprises a second optics group 185. Typically, the second optics group 185 comprises one or more optical elements, such as lenses. Preferably, the miniature camera shutter module 199 is located adjacent the second optics group 185. The miniature camera shutter module 199 contains a conduit 175 (shown in phantom) passing through its surface and is configured such that light passing through the second optics group 185, travels through the conduit 175 on the miniature camera shutter module 199 and then falls incident upon a recording surface 105. In some embodiments of the present invention, a first optics group 130 is positioned in front of the recording surface 105. A first optics groups 130 is used to cause light passing therethrough to fall substantially perpendicularly incident upon the recording surface 105.

The miniature camera chassis 100 is also configured with a first guide post 164 and a second guide post 163. The first optics group 130 and the second optics group 185 are slidably coupled to the first and second guide post 164 and 163. As such, the second optics group 185 and the miniature camera shutter module 199 are able to move along the first guide post 164 and the second guide post 163 in the y-direction, thereby affecting the light properties such as the focal point, depth of field, etc. In the preferred embodiment of the present invention, the miniature camera chassis 100 comprises a zoom/auto-focus camera chassis. Examples of such a zoom/auto-focus module are further described in U.S. Pat. No. 7,531,773, entitled "AUTO-FOCUS AND ZOOM MODULE", which is incorporated herein by reference.

In some embodiment of the present invention, the miniature camera chassis 100 fits within a miniature housing (not shown) and incorporated into a number of consumer electronic devices such as cellular telephones, personal data assistants, etc. According to these embodiments, the relative positions of the second optics group 185 is tracked in order to communicate information to a processor (not shown) for image processing purposes. In the preferred embodiment of the present invention, the miniature camera shutter module 199 also contains one or more solenoids (not shown) used to control one or more blade (not shown). The one or more blades are configured to at least partially eclipse the conduit 175 upon actuation of the one or more solenoids (discussed below), further affecting image processing.

Figure 1B:
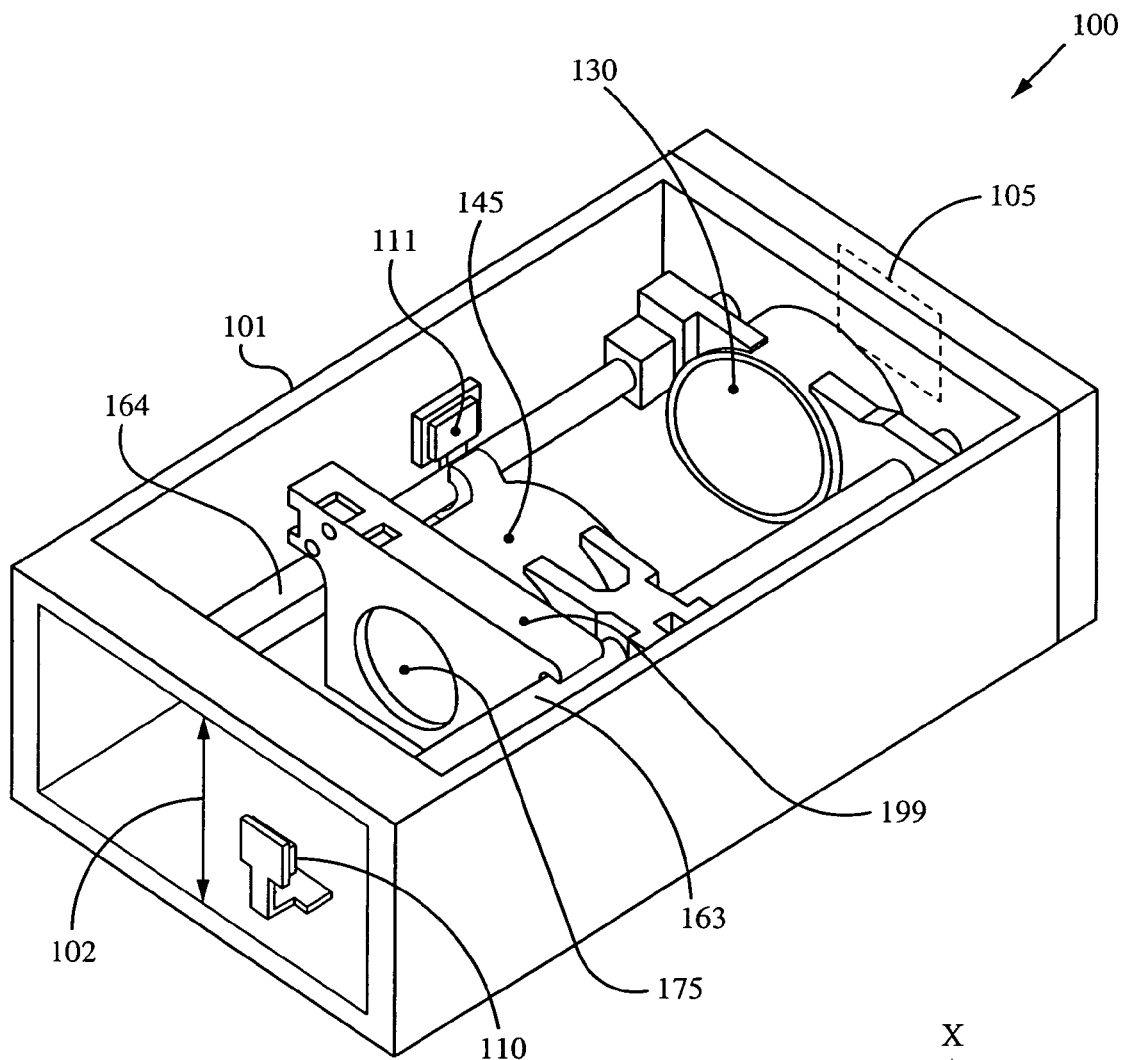
FIG. 1B illustrates a schematic isometric view of a miniature camera housing with a miniature camera shutter module according to some embodiments of the present invention.
Figure 1B:
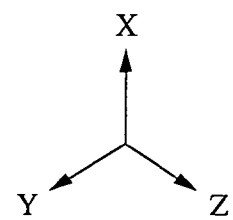

FIG. 1B illustrates a schematic isometric view of a housing comprising a miniature camera chassis 100 within a chassis frame 101 according to some embodiments of the present invention. The housing comprises the chassis frame 101, an opening 102 for allowing light into the housing, a third optics group 145 coupled to a miniature camera shutter module 199, a first position sensor 110, a second position sensor 111 and an imaging surface 105 (indicated with dashed lines). In some embodiments of the present invention, a first optics group 130 is positioned in front of the recording surface 105.

In some embodiments of the present invention, the imaging surface 105 is a photographic film or plate. In other embodiments of the present invention, the imaging surface 105 is an array of charge-coupled devices (CCD) or CMOS sensors. However, it will be readily apparent to those having ordinary skill in the art that any imaging surface 105 can be used in conjunction with the present invention. In some embodiment of the present invention, the camera chassis 100 also contains the other devices utilized in photography applications, now known or later developed.

The miniature camera shutter module 199 contains a conduit 175 configured to allow light to pass from the opening 102, through the conduit 175, through the third optics group 145, through the first optics group 130 and finally to fall incident upon the imaging surface 105. The miniature camera shutter module 199 is configured with one or more controllable blades (not shown) and one or more solenoid devices (not shown). The one or more solenoid devices (not shown) are controllable and are configured to actuate at least one of the one or more blades. When actuated, these blades are configured to at partially eclipse the conduit 175, thus altering the amount and/or quality of light passing through the conduit 175. For instance, in some embodiments of the present invention, a shutter blade (not shown) is used to completely eclipse the conduit 175, thus allowing the imaging surface 105 time to process an image without exposure to additional light.

Furthermore, the third optics group 145 is configured to move in the y-direction. According to these embodiments, the position sensor 110 tracks the movement of the first optics group. The position sensor 111 is able to accurately track the position of the third optics group 145 as its moves in order to deliver precise positional information to the processor (not shown). Therefore, the space around the position sensor 111 is not congested with other parts. The miniature camera shutter module 199 of the present invention is designed such that the space around the position sensor 111 is not obstructed while maintaining control of the one or more blades.

In some embodiments of the present invention, the miniature camera shutter module has height and width dimensions from five (5) millimeters to ten (10) millimeters and have a conduit diameter of approximately two (2) millimeters. In other embodiments of the present invention, miniature camera shutter module frames are custom-made for any given miniature camera applications.

Preferably, the miniature camera shutter module 199 shown in FIGS. 1A and 1B is a two-blade shutter module. A two-blade shutter module is configured such that one solenoid controls the movement of two blades, each of which are configured with a unique geometry such that each blade partially eclipses the conduit 175, resulting in a completely eclipsed conduit 175. Utilizing a two-blade configuration enables a very small camera shutter module 199.

Figure 2A:
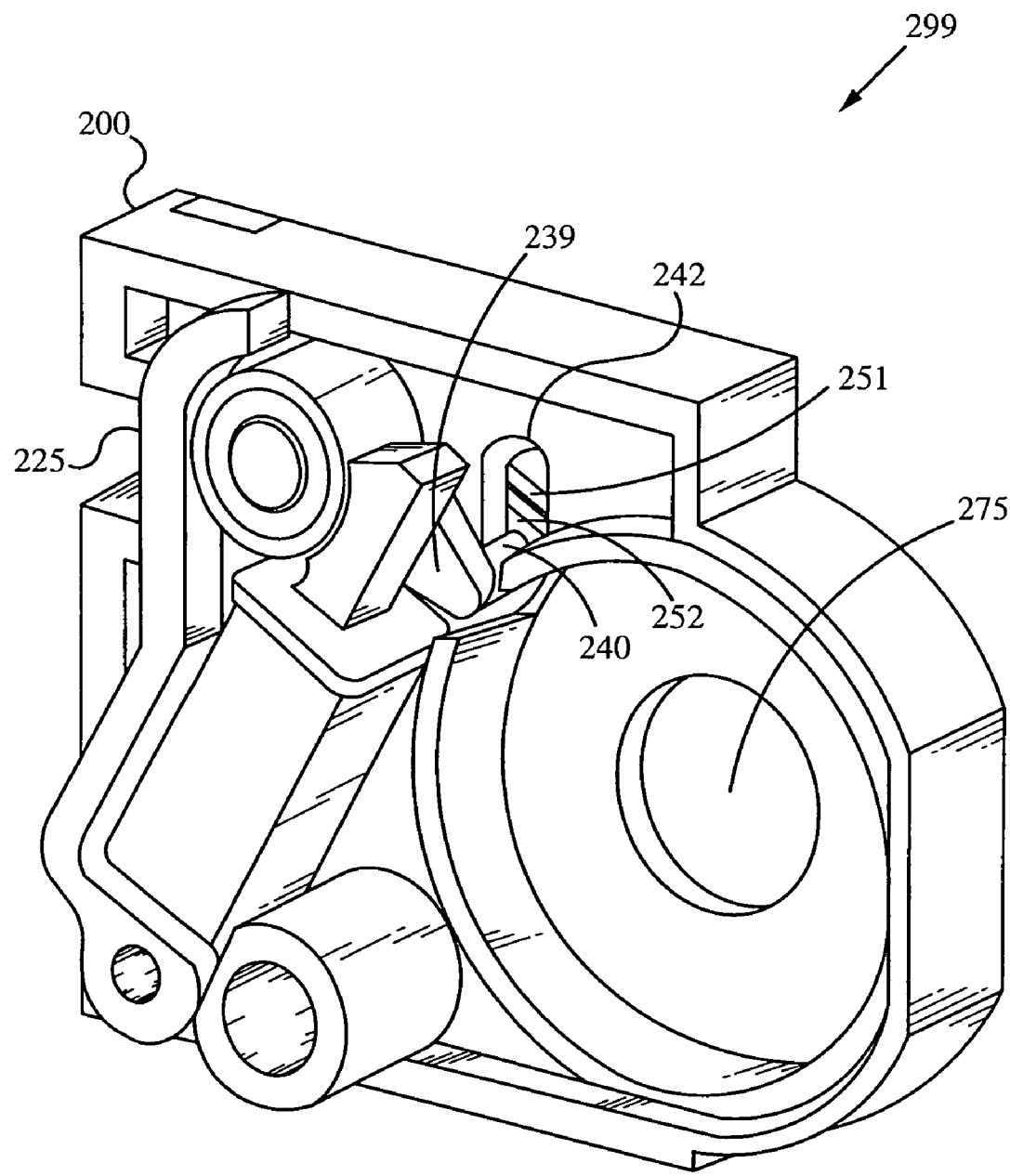
FIG. 2A illustrates a schematic isometric view of the solenoid side of a miniature camera shutter module with a solenoid on one side of the frame and multiple blades on the other side of the module frame according to some embodiments of the present invention.

In some embodiments of the present invention, at least one solenoid device is located on one side of a module frame and the at least one solenoid device controls at least one blade on the opposite side of the module frame. FIG. 2A illustrates a schematic isometric view of a miniature camera shutter module 299 with a solenoid 225 on one side of the module frame 200 and multiple blades 251, 252 on the other side of the module frame 200 according to some embodiments of the present invention. The module frame 200 is configured with a conduit 275 on its surface such that light from a light source is able to pass therethrough. The solenoid device 225 is coupled to an arm 239 and a pin 240. A channel 242 is disposed on the module frame 200 and the pin 240 is configured to pass through a channel 242 to the other side of the module frame 200. On the opposite side of the module frame 200, the pin 240 is coupled with blades 251 and 252. Upon actuation, the solenoid device 225 moves the pin 240 from the lower part of the channel 242 to the upper part of the channel 242.

Figure 2B:
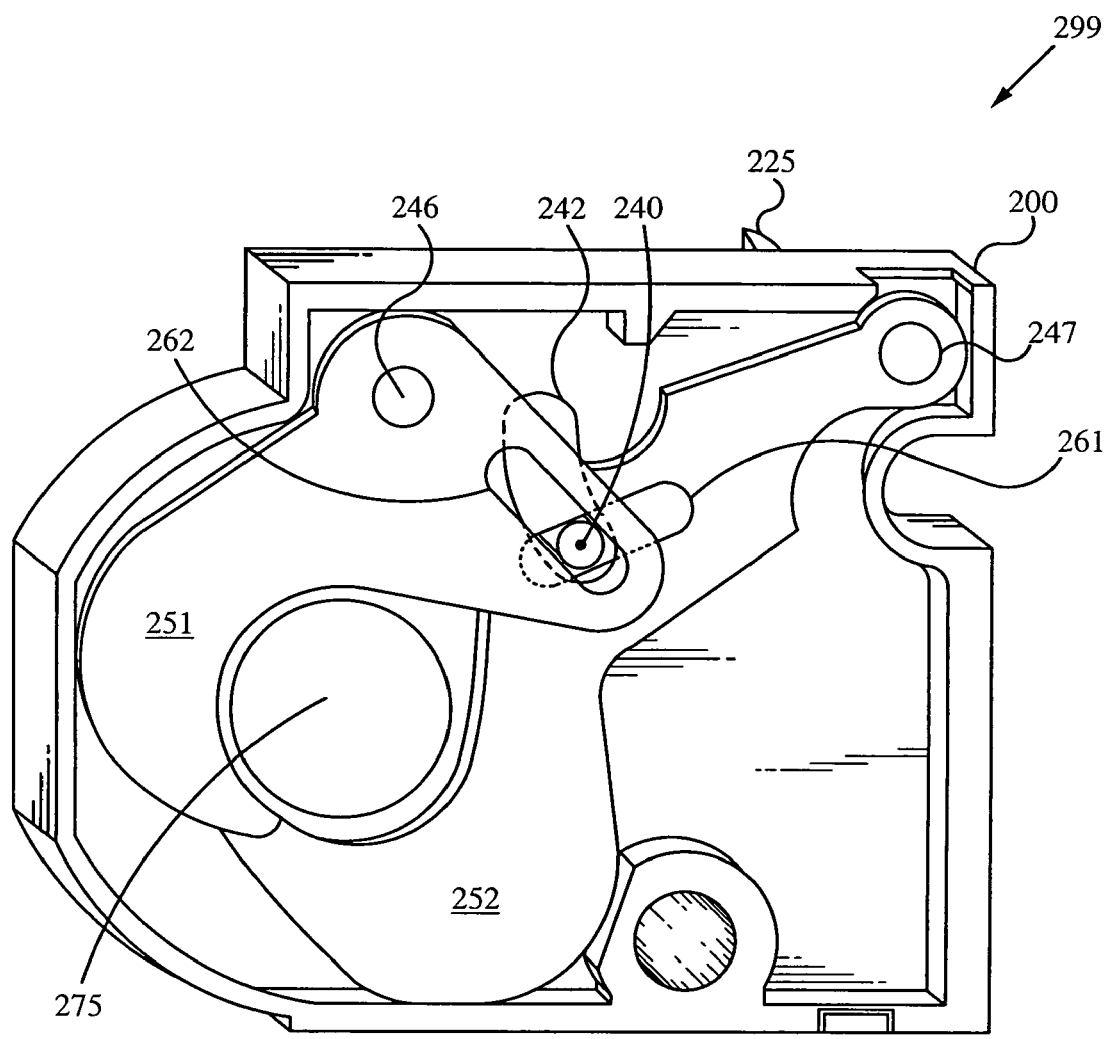
FIG. 2B illustrates a schematic isometric view of the blade side of a miniature camera shutter module with a solenoid on one side of the frame and multiple blades on the opposite side of the frame according to some embodiments of the present invention.

FIG. 2B illustrates a schematic isometric view of the opposite side of the camera shutter module 299 as illustrated in FIG. 2A. FIG. 2B shows the top corner of a solenoid device 225 coupled to the side of the module frame 200 illustrated in FIG. 2A. As explained above, the solenoid device 225 is coupled to an arm 239 (not shown in FIG. 2B) and a pin 240 which extends into the channel 242 (partially indicated with dashed lines). The pin 240 further extends into guides 262 and 261 (partially indicated with dashed lines) which are located on blades 251 and 252, respectively. Blade 251 is coupled to the module frame 200 via axle 246 and the blade 252 is coupled to the module frame 200 via axle 247.

As shown, the two blades 251 and 252 are configured such that when the solenoid device 225 is actuated and the pin 240 moves in the channel 242, the pin 240 exerts a force on the guides 261 and 262, causing the blade 251 to move in a counter-clockwise direction and causing the blade 252 to move in a clockwise direction. Blade 252 is configured to move under blade 251 so as not to impede the movement of the blade 251. As such, the blades 251 and 252 simultaneously eclipse the conduit 275 upon actuation of the solenoid device 225.

The unique geometry of the guides 262 and 261 and the arc movement of the pin 240 limit the amount of work required of the solenoid 225. For instance, the pin 240 effectuates movement of the blade 252 first because the guide 261 in blade 252 is initially substantially perpendicular to the arc movement of the pin 240 and because the arc movement of the pin 240 does not initially substantially interact with the guide 262 on blade 251. Only after the blade 252 has been moved sufficiently by approximately twenty percent, does the blade 251 begin to move. As such, the amount of work required by the solenoid 225 is spread out. Less work is required to move two, less massive blades than one larger, more massive blade. Therefore, the power required by the arm and pin 240 is less than would be required if one, larger blade were used to effectuate an eclipse of the conduit 275. Also, after being once removed from a pre-actuation rest position, the pin 240 already has an amount of kinetic energy when it substantially encounters the guide 262 of the second blade 251, therefore requiring less work in overcoming the inertia of the second blade. Once the arc movement of the pin 240 interacts with the guide 262 of second blade 251, the blades 251 and 252 now move simultaneously to eclipse the conduit 275.

Figure 2C:
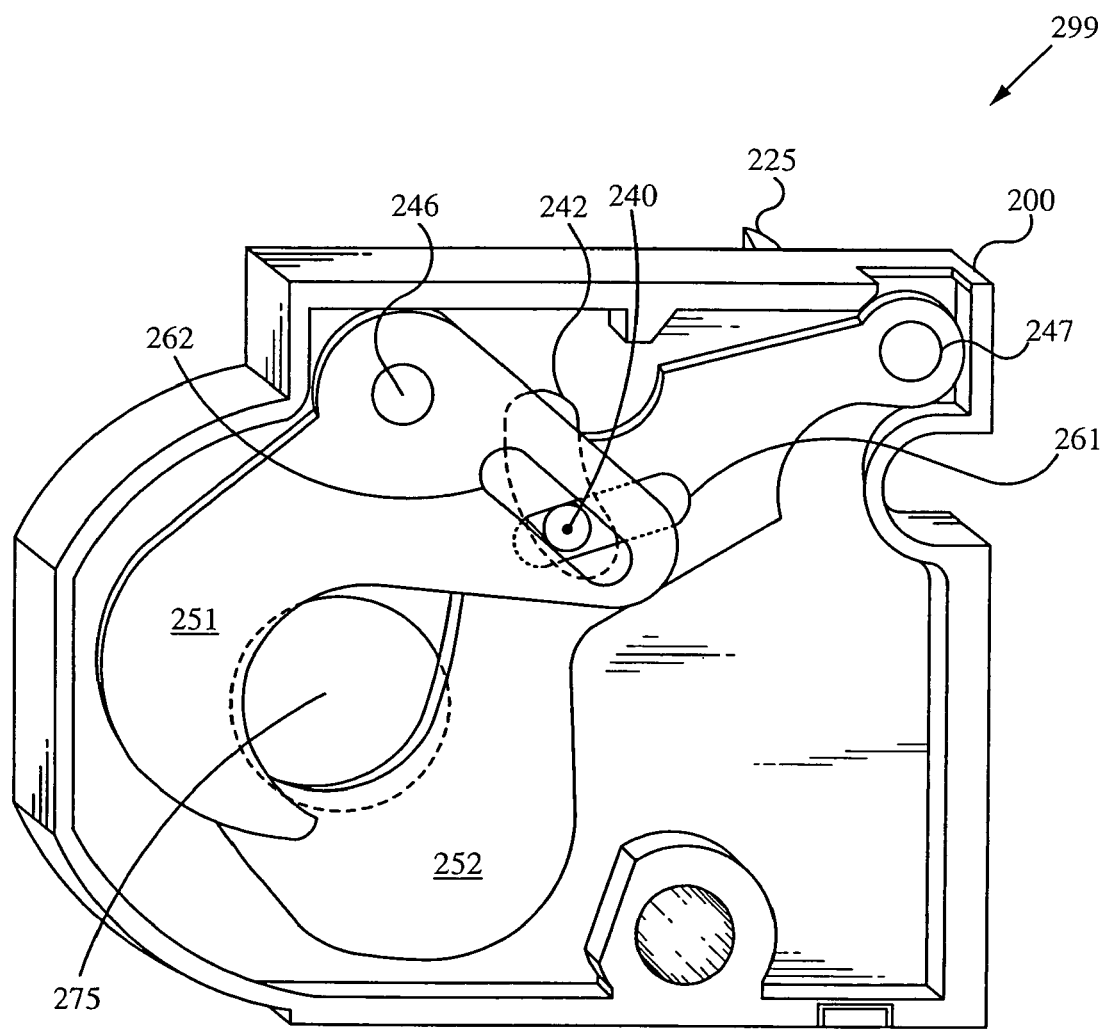
FIGS. 2C and 2D illustrates schematic isometric views of the blade side of a miniature camera shutter module during a closing process according to some embodiments of the present invention.
Figure 2D:
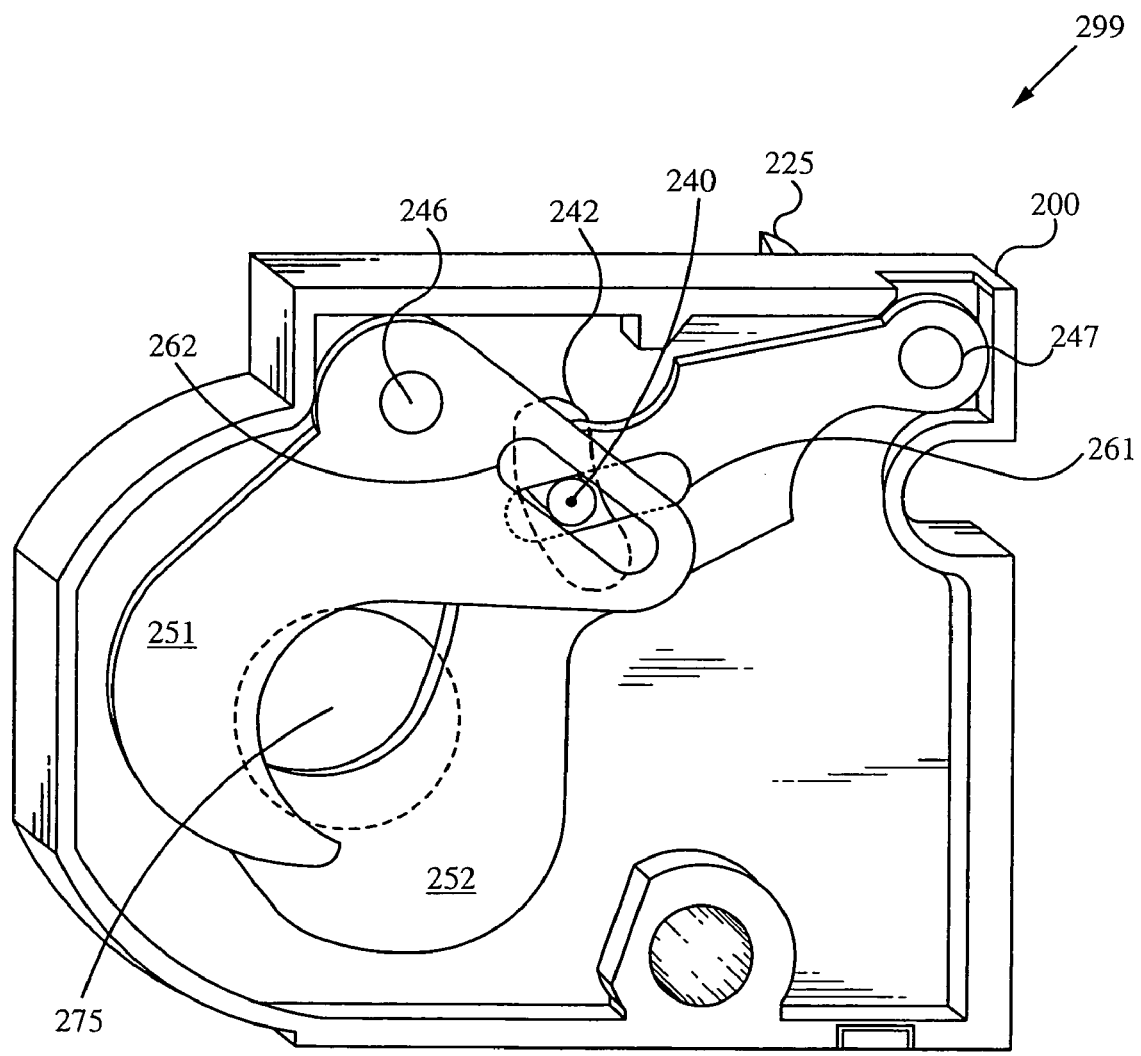

FIG. 2C illustrates the camera shutter module 299 with the blade 252 having moved sufficiently by approximately twenty percent and the blade 251 just beginning to move. FIG. 2D illustrates the camera shutter module 299 with both the blades 252 and 251 in the process of closing as the pin 240 is actuated.

Again, this unique configuration helps reduce the overall amount of work required from the solenoid, thus enabling the module designer the option of using a smaller solenoid. The unique configuration of the guides 261 and 262 enables the module designer the option of using a smaller solenoid. As such, this improvement helps reduce the overall size of the camera shutter module 299. Additionally, two smaller blades are able to eclipse a conduit faster than if one larger blade is used. As such, the present invention can be configured to optimize shutter speeds.

In some embodiments of the present invention, the blades 251 and 252 are opaque surfaces. Opaque blades serve as a shutter to completely block light from passing through the conduit 275 upon actuation of the solenoid device 225 which causes a total eclipse the conduit 275. In other embodiments, the blades 251 and 252 are opaque, but only partially eclipse the conduit 275. According to these embodiments, the two blades serve as an aperture to partially block out light. In other embodiments of the present invention, the blades 251 and 252 contain filters to filter light when in the blades 251 and 252 eclipse the conduit 275.

Figure 2E:
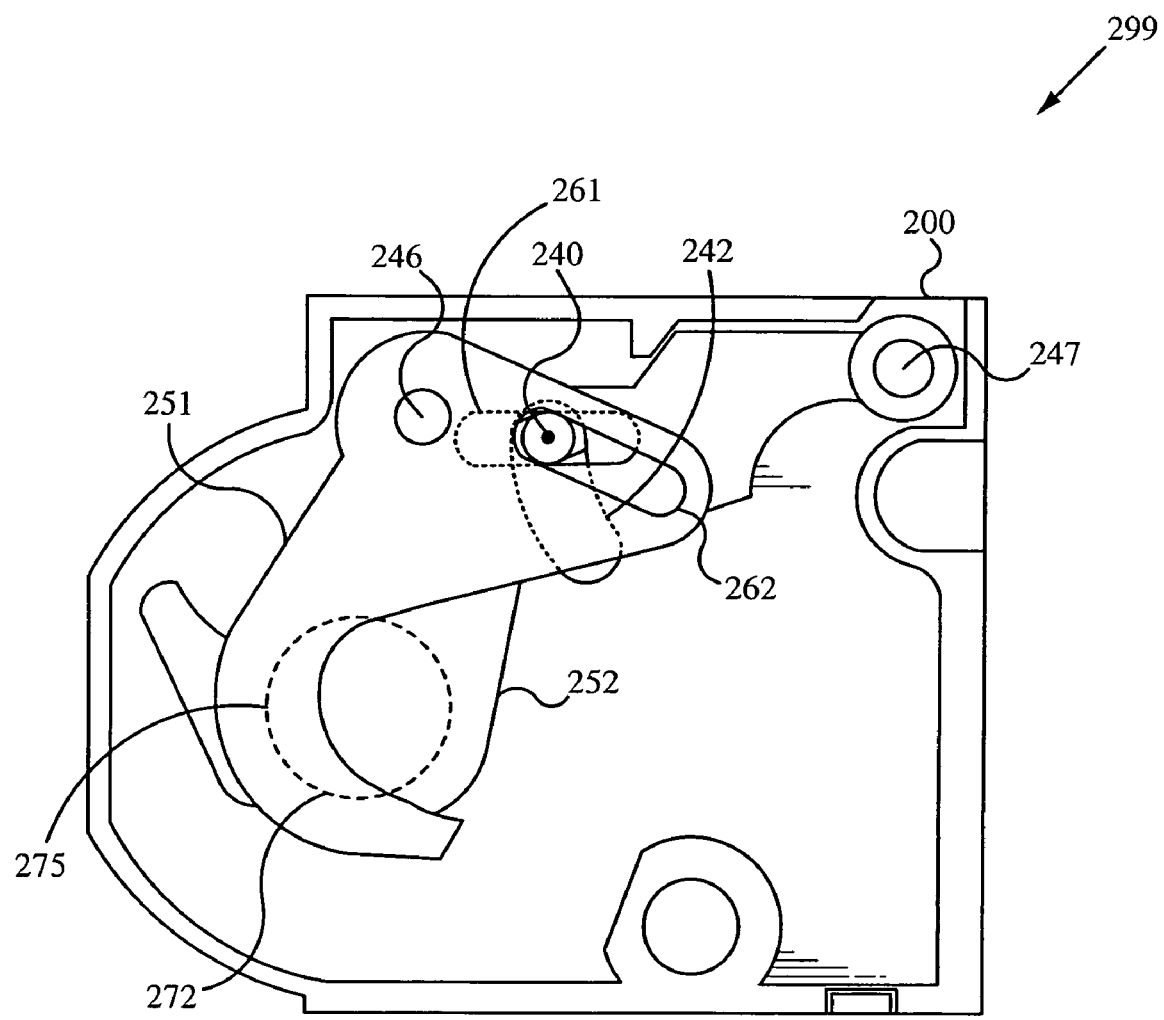
FIG. 2E illustrates a schematic side view of a miniature camera shutter module with multiple blades shuttering a conduit according to some embodiments of the present invention.

FIG. 2E illustrates the camera shutter module 299 with the blades 251 and 252 in a "closed" position. As shown, the blades 251 and 252 combine to completely eclipse the conduit 275 (indicated with dashed lines). The configuration of the blades 251 and 252 as well as the guides 262 and 261 help achieve an object of the present invention, which is to minimize the size of the module while retaining full shuttering functionality of the blades.

In addition to the function and arraignment of the two blade shutter approach, as explained above, a filter blade or aperture blade can be incorporated on a miniature camera shutter module to achieve filtering and/or aperture functions.

FIGS. 3A-3G show a miniature camera shutter module 399 utilizing a two blade shutter and filter blade module for shuttering and providing a filter according to some embodiments of the present invention.

Figure 3A:
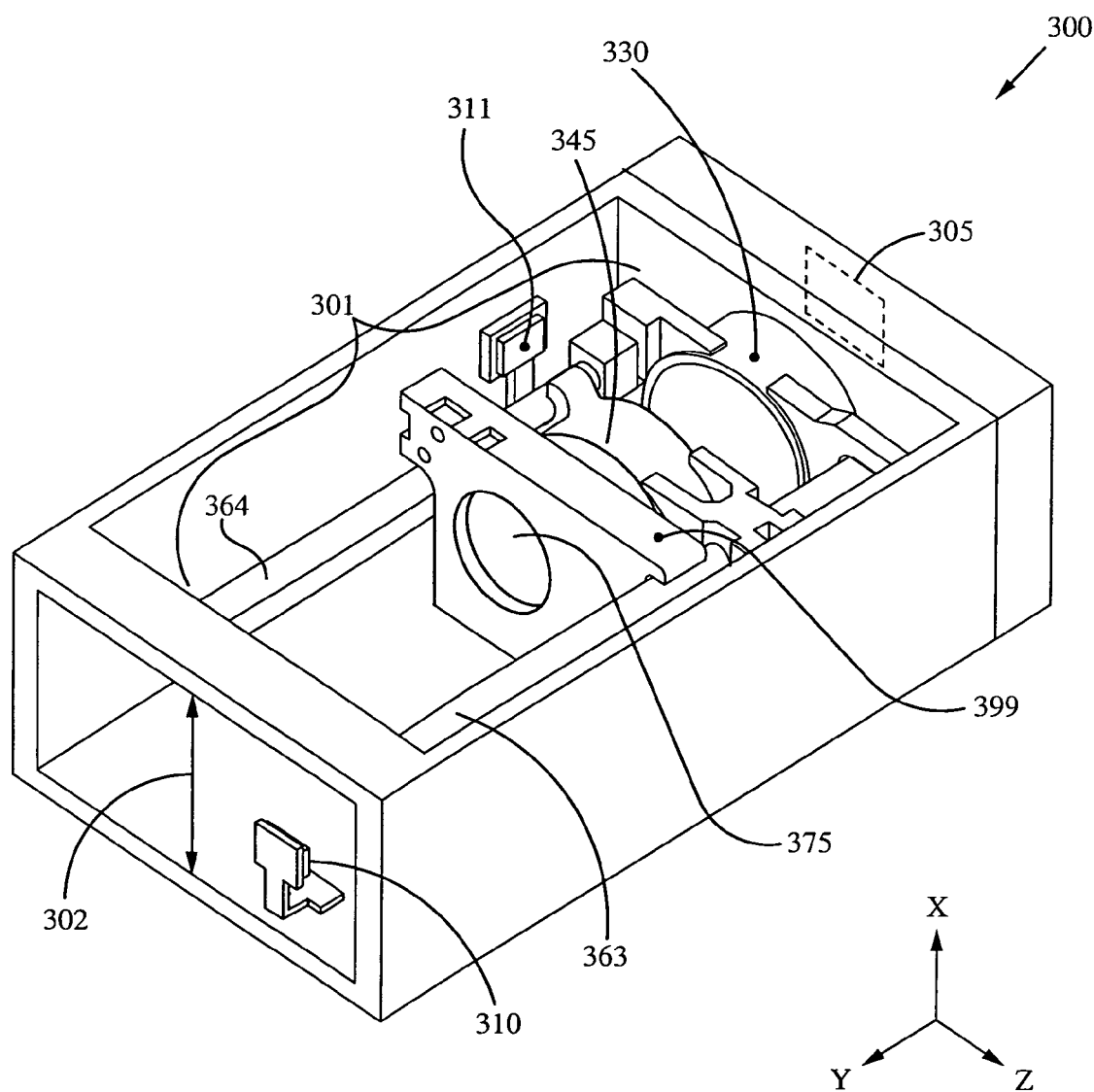
FIG. 3A illustrates a schematic isometric view of an alternative miniature camera chassis and housing a miniature camera shutter module with a two-blade shutter and filter blade according to some embodiments of the present invention.

FIG. 3A illustrates a camera housing 300 with a miniature camera chassis 301 and a miniature camera shutter module 399 with a two blade shutter (not shown) and filter blade (not shown) according to some embodiments of the present invention. The camera chassis 301 also comprises a first optics group 345. Typically, the optics group 345 comprises one or more optical elements, such as a lens. Preferably, the miniature camera shutter module 399 is located between the first optics group 345 and an opening 302. Also, the miniature camera shutter module 399 is preferably coupled to the first optics group 345. The miniature camera shutter module 399 contains a conduit 375 passing through its surface and is configured such that light passing through the opening 302, travels through the conduit 375 on the miniature camera shutter module 399, passes through the first optics group 345 and then falls incident upon a recording surface 305. In some embodiments of the present invention, a second optics group 330 is positioned in front of the recording surface 305.

The miniature camera chassis 301 is also configured with a first guide post 364 and a second guide post 363. The first optics group 345 and the second optics group 330 are slidably coupled to the first and second guide post 364 and 363. As such, the first optics group 345 and the miniature camera shutter module 399 are able to move along the first guide post 364 and the second guide post 363 in the y-direction. In the preferred embodiment of the present invention, the miniature camera chassis 300 comprises a zoom/auto-focus camera chassis. Examples of such a zoom/auto-focus module are further described in U.S. Pat. No. 7,531,773, entitled "AUTOFOCUS AND ZOOM MODULE", which is incorporated herein by reference.

In some embodiment of the present invention, the miniature camera chassis 301 is incorporated into a number of consumer electronic devices such as cellular telephones, personal data assistants, etc.

According to these embodiments, the relative positions of the first optics group 345 and the miniature camera shutter module 399 must be tracked in order to communicate information to a processor (not shown) for image processing purposes.

Accordingly, the position sensor 311 tracks the movement of the miniature camera shutter module 399. Furthermore, the miniature camera shutter module 399 contains one or more solenoids (not shown) used to control the two blade shutter (not shown) and the filter blade (not shown). The two blade shutter is configured to at eclipse the conduit 375 upon actuation of a solenoid (discussed below). Likewise the filter blade is configured to eclipse the conduit 375 upon actuation of a solenoid (discussed below). As previously mentioned, the position sensors 310 and 311 are able to accurately track the position of the components as they move in order to deliver precise positional information to the processor (not shown). Therefore, the space around the position sensor 311 is not congested with other parts. The miniature camera shutter module 399 of the present invention is designed such that the space around the position sensor 311 is not obstructed while maintaining control of the one or more blades.

It is desirable to keep the blades as close to the plane of the conduit as possible for calibration purposes. Therefore, in the preferred embodiment of the present invention, the two blade shutter and the filter blade are positioned on the other side of the module from the one or more solenoid devices such that the one or more blades are able to be positioned close to the plane of the conduit 375.

Figure 3B:
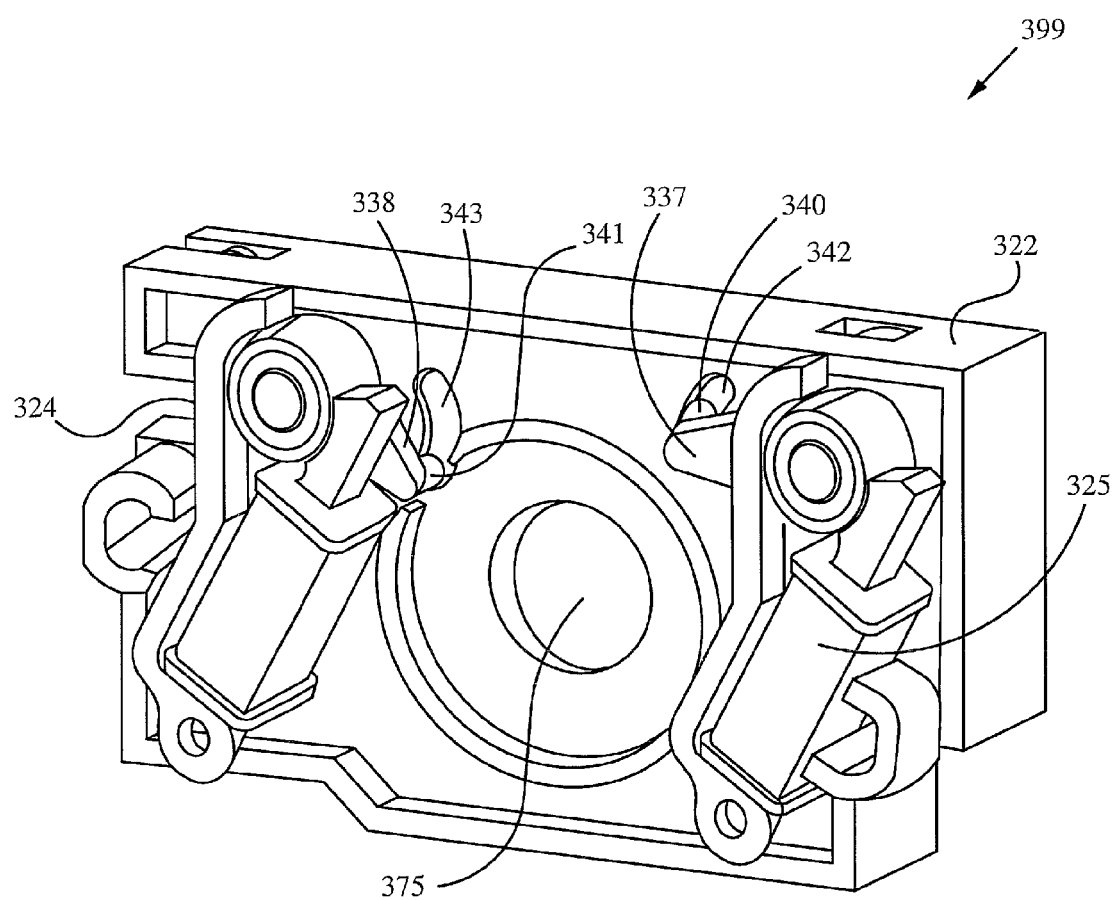
FIG. 3B illustrates a schematic perspective view of the alternative miniature camera shutter module with two solenoids on the module frame to control a filter blade and two shuttering blades according to some embodiments of the present invention.

FIG. 3B illustrates a schematic of the miniature camera shutter module 399 according to some embodiments of the present invention. A conduit 375 is disposed in the module frame 322 for allowing light to pass therethrough. A first solenoid 325 and a second solenoid 324 are also coupled to the module frame 322. The first solenoid 325 is coupled to an arm 337 and a pin 340. The pin 340 extends through the module frame 322 via channel 342. The channel 342 is configured to facilitate the arc movement of the pin 340 when the solenoid 325 is actuated. Likewise, the second solenoid 324 is coupled to an arm 338 and pin 341. The pin 341 extends through the module frame 322 via channel 343. The channel 343 is configured to facilitate the arc movement of the pin 341 when the solenoid 324 is actuated.

FIG. 3C illustrates a perspective schematic view of blades 351, 352 and 353 used in the embodiments of the present invention illustrated in FIGS. 3A-3G. It will be readily apparent to those having ordinary skill in the art that numerous configuration for the one or more blades used are contemplated. The blade 351 (partially indicated with dashed lines) comprises a primary blade 350 with an axle 347 and a guide 360 passing through the primary blade 350 surface. Furthermore, a filter 354 is coupled to the top of primary blade 350 via couplings 349. It is sometimes desirable to couple a filter to a blade instead of only using a filter because certain filters are configured from material too brittle to be coupled to an axle or to a pin directly without damaging the filter upon actuation of the solenoid. However, those with ordinary skill in the relevant art will appreciate that a filter is able to, by itself, be used in certain applications.

In some embodiments of the present invention, the filter 354 is a neutral-density filter. A neutral-density filter filters out equal portions of a wide range of wavelengths of light passing therethrough and is a common photography device. In other embodiments of the present invention, the filter 354 is a monochromatic filter. Monochromatic filters filter out light having a small range of wavelengths. Although neutral-density filters and monochromatic filters are specifically disclosed, any appropriate filter is equally envisioned.

The blades 352 and 353 are used as the two blade shutter and each have an axle 346 and 348, respectively. Furthermore, the blades 352 and 353 each have a guide 361 and 362, respectively, wherein the guides are used to guide the movement of the blades 352 and 353 upon actuation of the solenoids.

Figure 3D:
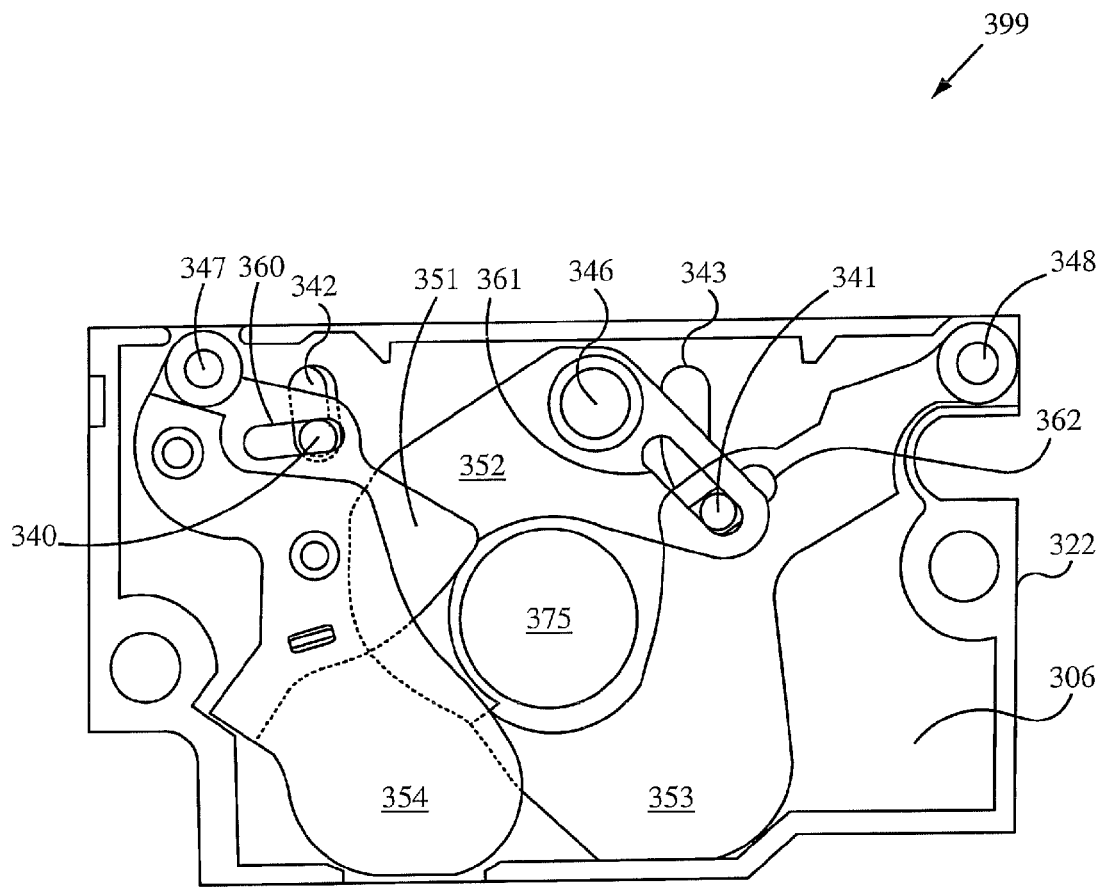
FIG. 3D illustrates a schematic side view of the alternative miniature camera shutter module with a filter blade and two shuttering blades according to some embodiments of the present invention.

FIG. 3D illustrates the opposite side of the module frame 322, as that shown in FIG. 3B. As shown, the blades 351, 352 and 353 are coupled to the module frame 322. Blades 352 and 353 are used for shuttering a conduit 375, and the blade 351 is used to eclipse the conduit 375 with filter 354. The blade 351 is coupled to the module frame 322 via axle 347, blade 353 is coupled to the module frame via axle 348 and blade 352 is coupled to the module frame 322 via axle 346. In some embodiments of the present invention, a recessed area 306 is disposed on the surface of the blade side of the module frame 322 such that the blades 351, 352 and 353 are substantially located within the recessed area 306. Also located on the module frame 322 is a conduit 375 for allowing light to pass therethrough.

In some embodiments of the present invention, a first solenoid (not shown) and the second solenoid are located on the opposite side of the module frame 322, as shown in FIG. 3B. According to these embodiments, a first arm (not shown) and a first pin 340 are coupled to a first solenoid (not shown) and a second arm (not shown) and pin 341 are coupled to a second solenoid. The pin 340 is actuated by a first solenoid and the pin 341 is actuated by a second solenoid. Also, as explained above, channels 342 and 343 are disposed in the module frame 322 which allow the pins 340 and 341 to pass through the module frame and guide the movement of blades 351, 352 and 353. The pins 340 and 341 extend from the solenoid side of the module frame 322 into the blade side of the module frame 322. The pin 340 extends into a guide 360 located on the blade 351, the pin 341 extends into a guide 361 located on the blade 352 and into a guide 362 on blade 353. Accordingly, the blade 351 is movable by moving the pin 340 and the blades 352 and 353 are movable by moving the pin 341.

The first solenoid is configured to receive a first electric signal for actuating the first solenoid. The second solenoid is configured to receive a second electric signal for actuating the second solenoid. In some embodiments, the first electric signal and the second electric signal are delivered to the first solenoid and the second solenoid simultaneously. Alternatively, the first electric signal and the second electric signal are delivered to the first solenoid and the second solenoid at separately in time.

In some embodiments of the present invention, a miniature camera shutter module having a substantially rectangular shape has height and width dimensions from five (5) millimeters to ten (10) millimeters and has a conduit diameter of approximately two (2) millimeters. In other embodiments of the present invention, miniature camera shutter module frames are custom-made for miniature camera applications.

FIG. 3D illustrates a schematic side view of the module frame 322 after the pin 341 has been actuated by the solenoid 324. Accordingly, the blades 352 and 353 are forced into an actuated position as the pin 341 exerts force on the guides 362 and 361 as it passes through channel 343. According to some embodiments of the present invention, the blades 352 and 353 are opaque and, as such, the blades 352 and 353 serve as a shutter to completely block light from passing through the conduit 375.

Furthermore, the guides 361 and 362 are configured with a unique geometry in order limit the amount of work required of the solenoid (not shown). The guides 361 and 362 and the arc movement of the pin 341 limit the amount of work required of the solenoid 324. For instance, the pin 341 effectuates movement of the blade 353 first because the guide 362 in blade 353 is initially substantially perpendicular to the arc movement of the pin 341 and because the arc movement of the pin 341 does not initially substantially interact with the guide 361 on blade 352. Only after the blade 353 has been moved sufficiently by approximately twenty percent, does the blade 352 begin to move. As such, the amount of work required by the solenoid 324 is spread out. Less work is required to move two, less massive blades than one larger, more massive blade. Therefore, the power required by the arm and pin 341 is less than would be required if one, larger blade were used to effectuate an eclipse of the conduit 375. Also, after being once removed from a pre-actuation rest position, the pin 341 already has an amount of kinetic energy when it substantially encounters the guide 361 of the blade 352, therefore requiring less work in overcoming the inertia of the second blade. Once the arc movement of the pin 341 interacts with the guide 361 of blade 352, the blades 352 and 353 now move simultaneously to eclipse the conduit 375.

Again, this unique configuration helps reduce the overall amount of work required from the solenoid, thus enabling the module designer the option of using a smaller solenoid. The unique configuration of the guides 361 and 362 enables the module designer the option of using a smaller solenoid. As such, this improvement helps reduce the overall size of the camera shutter module 399. Additionally, two smaller blades are able to eclipse a conduit faster than if one larger blade is used. Additionally, two smaller blades are able to eclipse a conduit faster than if one larger blade is used. As such, the present invention can be configured to optimize shutter speeds.

Figure 3E:
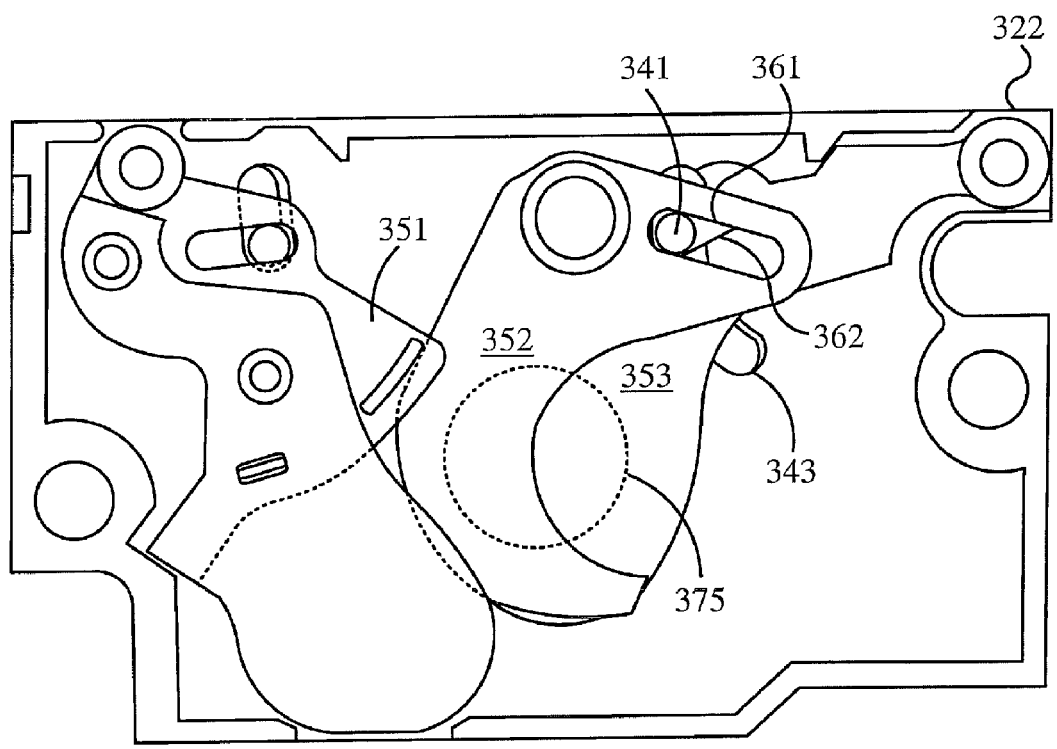
FIG. 3E illustrates a schematic side view of the alternative miniature camera shutter module with a non-actuated filter blade and two shuttering blades shuttering a conduit according to some embodiments of the present invention.

FIG. 3E illustrates a schematic side view of the module frame 322 after the pin 341 is actuated by the solenoid 324.

The blades 352 and 353 have been forced into the actuated position to eclipse the conduit 375 while the blade 351 is not actuated.

Figure 3F:
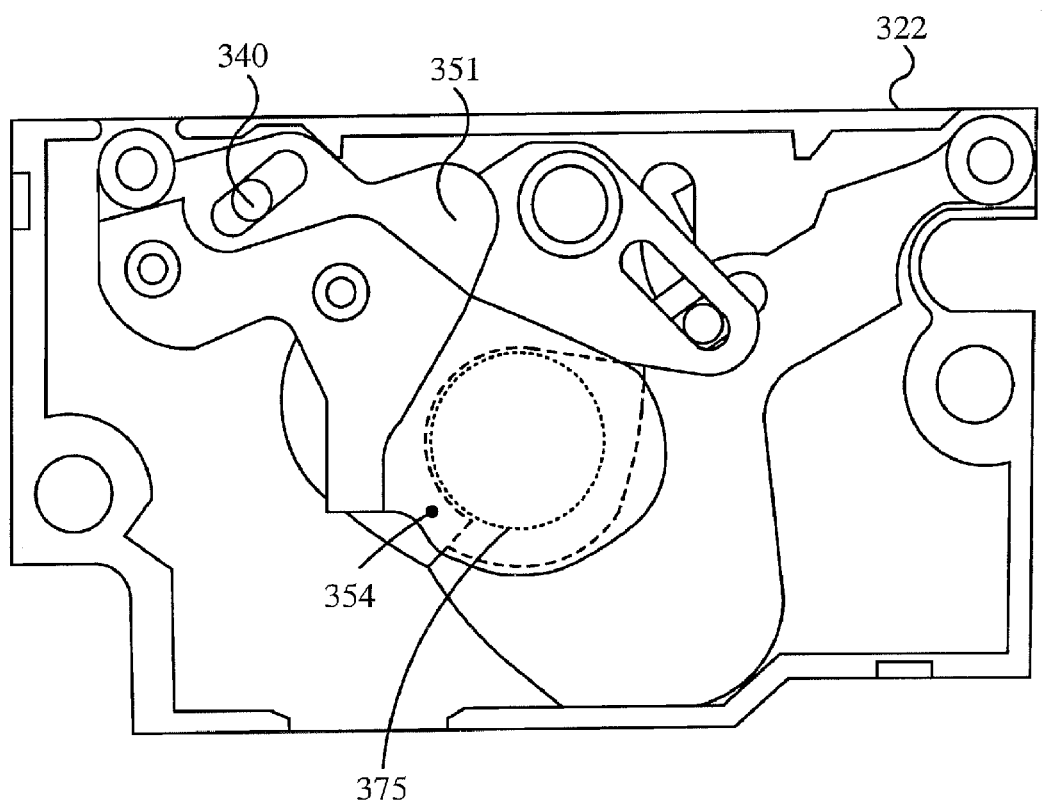
FIG. 3F illustrates a schematic side view of the alternative miniature camera shutter module with a filter blade covering a conduit and non-actuated two shuttering blades according to some embodiments of the present invention.

FIG. 3F illustrates a schematic side view of the module frame 322 after the pin 340 is actuated by the solenoid 325. As such, the blade 351 has rotated and the filter 354 eclipses the conduit 375 (indicated with dashed lines).

Figure 3G:
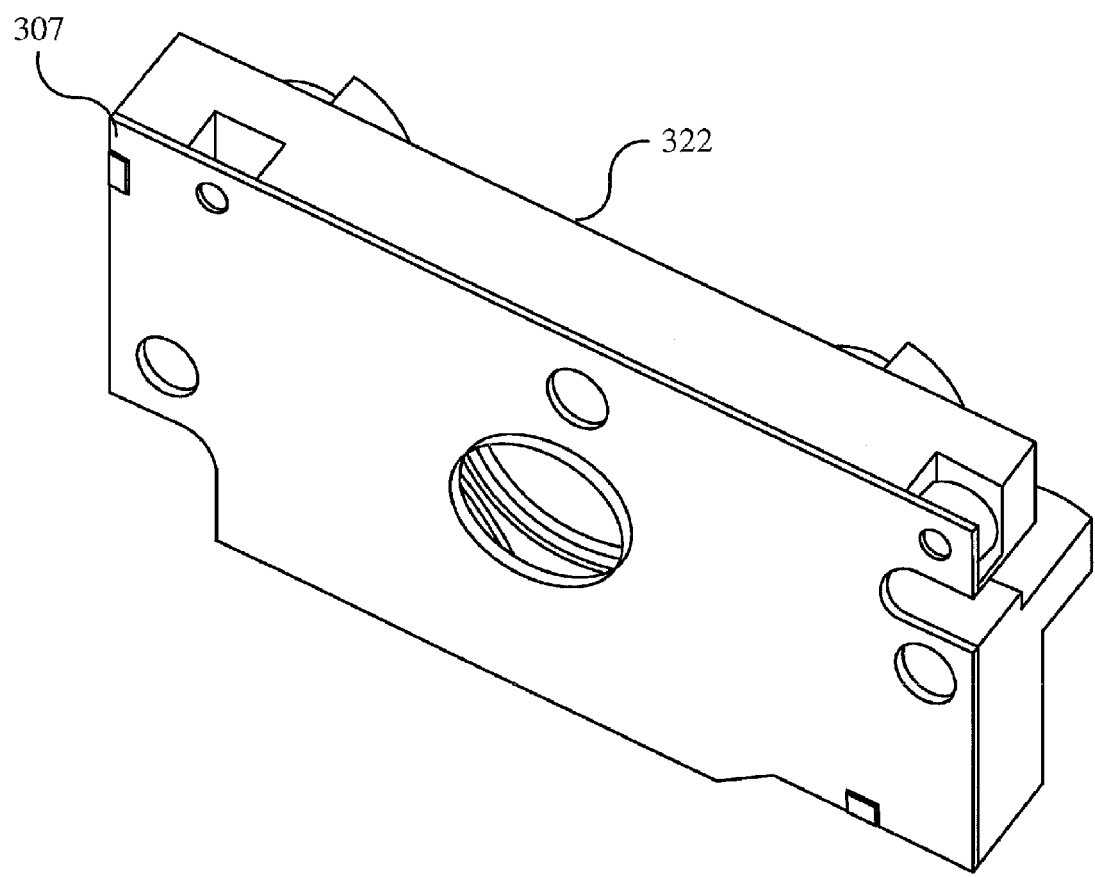
FIG. 3G illustrates a schematic side view of the alternative miniature camera shutter module with a cover covering the blades according to some embodiments of the present invention.

FIG. 3G illustrates a schematic isometric view of the module frame 322 with a cover 307 covering the blades 353, 352, 351 (not shown in FIG. 3G) and the filter 354 (not shown in FIG. 3G). The cover 307 is configured to protect the moving parts held within.

Figure 4:
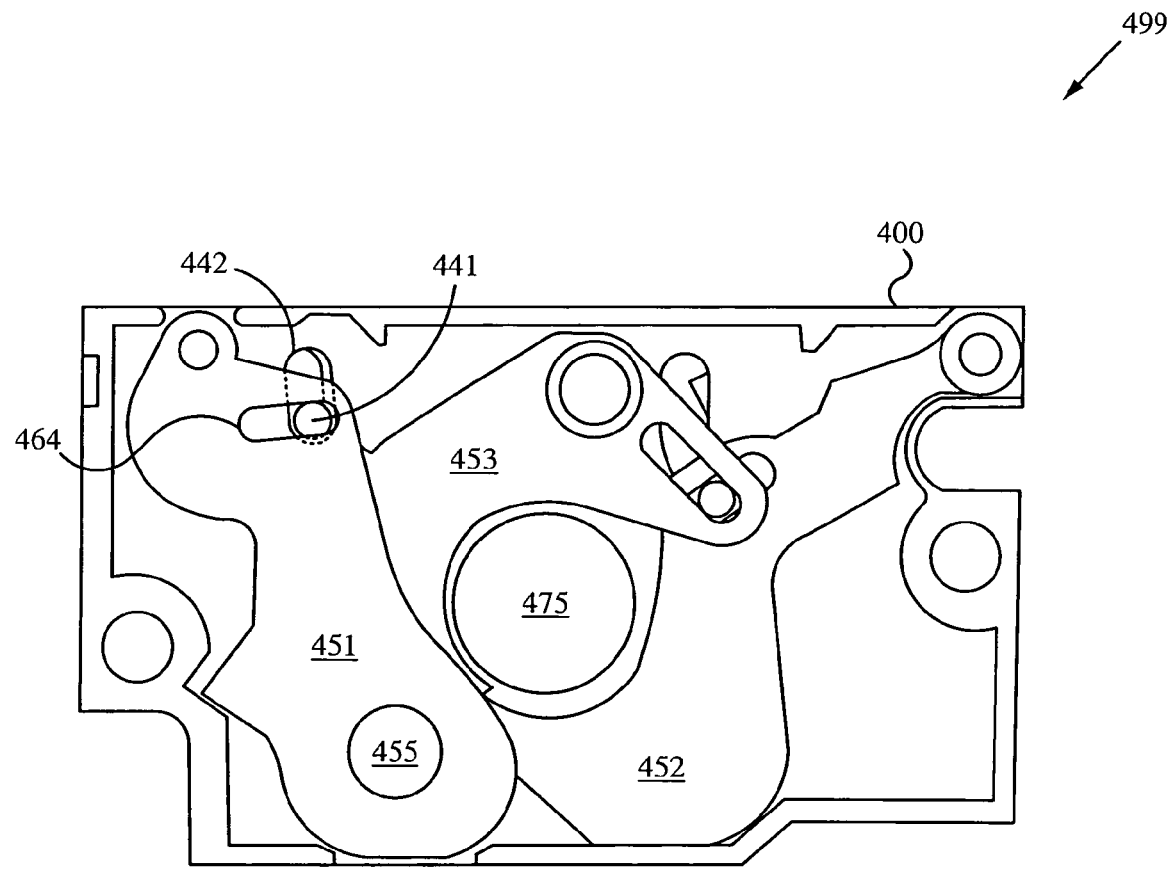
FIG. 4 illustrates a schematic side view of another miniature camera shutter module with an aperture blade and two shuttering blades according to some embodiments of the present invention.

FIG. 4 illustrates a schematic side view of a miniature camera shutter module 499 according to some embodiments of the present invention. According to these embodiments, two blade 452 and 453 are configured to shutter a conduit 475 and a third blade 451 is designed with an aperture 455 to partially block the conduit 475. The aperture blade 451 is actuated as a pin 440 and arm (not shown) moves through the channel 442 and exerts a force on the guide 464. 20 When actuated, the blade 451 partially eclipses the conduit 475.

According to the embodiments described in FIGS. 3A-4, more than one solenoid are used to provide the ability to perform dual-blade shuttering and the ability to use an additional blade to filter and/or provide an aperture to miniature camera applications. Dual-blade shuttering allows the camera shutter module to be used in miniature applications and results in optimized shutter speeds.

What is claimed is:

1. A miniature camera shutter module comprising:
   a. a module frame with a conduit passing therethrough;
   b. a solenoid coupled to the module frame, wherein the solenoid is configured to receive an electric signal for actuating the solenoid;
   c. a pin coupled to the solenoid;
   d. a first axle coupled to the module frame;
   e. a second axle coupled to the module frame;
   f. a first blade with a first guide, wherein the first blade is coupled to the first axle, wherein the first blade is substantially disposed in the same plane as the module frame, wherein the pin extends into the first guide, and wherein the first blade is configured such that the actuation of the solenoid causes the pin to move, causing the first blade to rotate about the first axle and at least partially eclipse the conduit;
   g. a second blade with a second guide, wherein the second blade is coupled to the pin and the second axle, wherein the second blade is substantially disposed in the same plane as the module frame, wherein the pin extends into the second guide, and wherein the second blade is configured such that the actuation of the solenoid causes the pin to move, causing the second blade to rotate about the second axle and at least partially eclipse the conduit, wherein the pin is configured to run substantially parallel to a length of the second guide at a beginning portion of the motion of the pin, whereby the pin effectuates movement of only the first blade during the beginning portion.

2. The miniature camera shutter module according to claim 1, further comprising a channel in the module frame, wherein the first blade and the second blade are disposed on a first side of the module frame, wherein the solenoid is coupled to a second side of the module frame, wherein an arm is coupled to the solenoid, wherein the arm is coupled to the pin, and wherein the pin extends from the second side of the module frame to the first side of the module frame through the channel and into the first guide and into the second guide.

3. The miniature camera shutter module according to claim 2, wherein the channel, the first guide and the second guide are configured with a geometry such that upon actuation of the solenoid, the pin interacts with the first guide and does not substantially interact with the second guide, and such that the pins substantially interacts with the second guide as the rotation of the first blade is substantially complete.

4. The miniature camera shutter module according to claim 1, wherein the first blade and the second blade comprises opaque shutters such that when the first blade and the second blade eclipses the conduit, the first blade and the second blade obstruct light passing through the conduit.

5. The miniature camera shutter module according to claim 1, wherein at least one of the first blade and the second blade comprises an aperture blade having an aperture positioned on the surface of the aperture blade, wherein the aperture is smaller then the conduit such that, as the at least one blade eclipses the conduit, the aperture at least partially obstructs light from passing through the conduit.

6. The miniature camera shutter module according to claim 1, wherein at least one of the first blade and the second blade comprises a filter blade comprising a filter coupled to that blade such that, as that blade eclipses the conduit, the filter at least partially filters light from passing through the conduit.

7. The miniature camera shutter module according to claim 6, wherein the filter is a wavelength-specific filter, wherein the wavelength-specific filter filters out the portion of light passing through the conduit having a particular range of wavelengths.

8. The miniature camera shutter module according to claim 6, wherein the filter is a neutral-density filter, wherein the neutral-density filter filters all wavelengths of light passing through the conduit.

9. The miniature camera shutter module according to claim 1, wherein the first blade and the second blade are multi-planar, wherein the first blade and the second blade pass over each other as the first blade and the second blade are rotated about the first axle and the second axle.

10. The miniature camera shutter module according to claim 1, further comprising:
    a. at least one additional solenoid coupled to the module frame;
    b. at least one additional pin coupled to the at least one additional solenoid;
    c. at least one additional axle coupled to the module frame; and
    d. at least one additional blade coupled to the at least one additional pin and to the at least one additional axle, wherein the at least one additional blade is substantially disposed in the same plane as the module frame, wherein the at least one additional solenoid is configured to receive a second electrical signal, wherein the second electric signal actuates the at least one additional solenoid, wherein actuation of the at least one additional solenoid causes the at least one additional pin to move, causing the at least one additional blade to at least partially eclipse the conduit.

11. The miniature camera shutter module according to claim 10, wherein the first electric signal and the second electric signal are delivered to the first solenoid device and the at least one additional solenoid device simultaneously.

12. The miniature camera shutter module according to claim 10, wherein the first electric signal and the second electric signal are delivered to the first solenoid device and the at least one additional solenoid device separately in time.

13. The miniature camera shutter module according to claim 10, further comprising at least one additional channel guide consisting of an additional channel in the module frame, wherein the at least one additional pin passes through the at least one additional blade and at least partially extends into the at least one additional channel guide such that, as the at least one additional solenoid moves the at least one additional pin, the direction of the movement of the at least one additional pin is directed by the at least one additional channel guide.

14. The miniature camera shutter module according to claim 10, wherein the at least one additional blade comprises a blade with an aperture positioned on the surface of the at least one additional blade, wherein the aperture is smaller then the conduit such that, when the at least one additional blade eclipses the conduit, the aperture at least partially obstructs light from passing through the conduit.

15. The miniature camera shutter module according to claim 10, wherein the at least one additional blade comprises a blade with a filter coupled to the at least one additional blade such that as the at least one additional blade eclipses the conduit, the filter at least partially filters light from passing through the conduit.

16. The miniature camera shutter module according to claim 1, further comprising a miniature camera chassis comprising:
  a. an enclosure with an opening on a first side of the enclosure for allowing light to enter the miniature camera chassis;
  b. an imaging surface disposed on a second side of the enclosure, wherein light entering the miniature camera chassis through the opening is directed toward the imaging surface, wherein the opening and the imaging surface are co-axial on a first axis;
  c. at least one guide post coupled within the enclosure, wherein the at least one guide post substantially comprises an axis between the opening and the imaging surface, wherein the module frame is coupled to the at least one guide post such that the module frame is slidable along the at least one guide post; and
  d. at least one position sensor for tracking the position of the module frame, wherein the solenoid is disposed on the module frame such that the solenoid does not interfere with the at least one position sensor's ability to track the position of the module frame.

17. The miniature camera shutter module according to claim 16, the miniature camera chassis further comprising:
  a. at least one optics group coupled to the at least one guide post such that the at least one optics group is slidable along the at least one guide post; and
  b. at least one additional position sensor for tracking the position of the module frame, wherein the solenoid is disposed on the module frame such that the solenoid does not interfere with the at least one additional position sensor's ability to track the position of the at least one optics group.

18. The miniature camera shutter module according to claim 17, wherein the at least one optics group comprises an optical lens.

19. The miniature camera shutter module according to claim 17, wherein the at least one optics group comprises a focusing lens.

20. The miniature camera shutter module according to claim 1, wherein the imaging surface comprises an array of CMOS sensors.

21. The miniature camera shutter module according to claim 1, wherein the imaging surface comprises an array of charge-coupled devices.

22. A miniature camera shutter module comprising:
  a. a module frame comprising a surface with a channel passing therethrough;
  b. at least one solenoid coupled to the module frame;
  c. at least one pin coupled to the at least one solenoid, wherein the at least one pin is configured to move in the channel upon actuation of the at least one solenoid; and
  d. at least two blades coupled to the at least one pin, wherein the at least two blades include a first blade with a first guide and a second blade with a second guide, wherein the first blade and the second blade are positioned such that the first guide is substantially perpendicular to the movement of the pin and the second guide is substantially parallel to the movement of the pin, wherein the at least one pin runs substantially parallel to the length of the second guide at a beginning portion of the motion of the at least one pin.

23. The miniature camera shutter module of claim 22, wherein the at least one pin effectuates movement of only the first blade during the beginning portion.

24. The miniature camera shutter module of claim 22, wherein the first blade is coupled to a first axle and the second blade is coupled to a second axle, wherein the first axle and the second axle are in opposite direction of the at least one pin.

25. The miniature camera shutter module of claim 22, wherein the first blade is configured to start to move towards a closing position prior to simultaneous movements of the first blade and the second blade towards the closing position, wherein the first blade and the second blade move in opposite directions.

* * * * *

UNITED STATES PATENT AND TRADEMARK OFFICE
CERTIFICATE OF CORRECTION

PATENT NO. : 7,806,606 B2  Page 1 of 1
APPLICATION NO. : 12/150874
DATED : October 5, 2010
INVENTOR(S) : Lothar Westerweck It is certified that error appears in the above-identified patent and that said Letters Patent is hereby corrected as shown below:

IN THE DETAILED DESCRIPTION, COL. 11, LINE 20

Remove -- 20 --

Signed and Sealed this

Thirtieth Day of November, 2010

David J. Kappos
*Director of the United States Patent and Trademark Office*